July 3, 1962    P. A. DUNN ET AL    3,041,984
RAILROAD JOURNAL AND WHEEL AXLE JACK SKIDDING DEVICE
Filed Feb. 23, 1961    2 Sheets-Sheet 1

Patrick A. Dunn
Larry A. Dunn
INVENTORS

BY *Clarence A. O'Brien*
and *Harvey B. Jacobson*
Attorneys

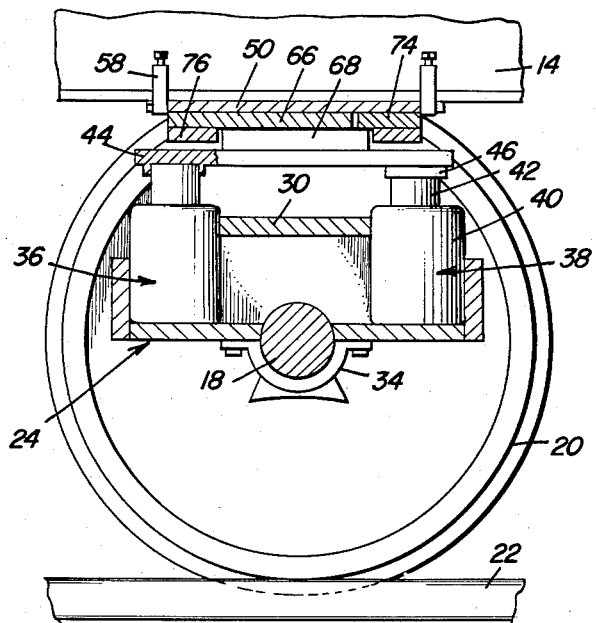
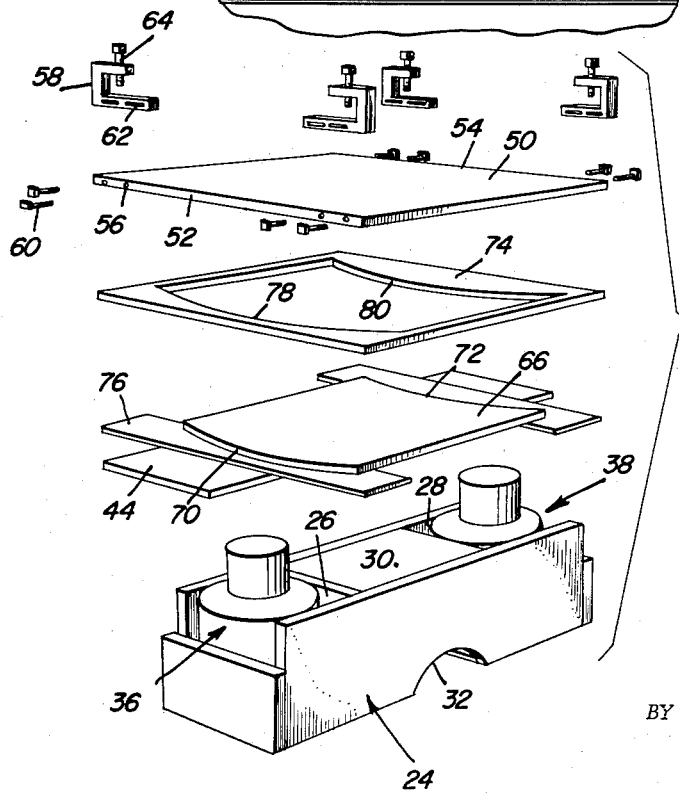

United States Patent Office 3,041,984
Patented July 3, 1962

3,041,984
RAILROAD JOURNAL AND WHEEL AXLE JACK SKIDDING DEVICE
Patrick A. Dunn, 318 Pool Drive, and Larry A. Dunn, 2911 Spokane, both of San Antonio, Tex.
Filed Feb. 23, 1961, Ser. No. 91,199
8 Claims. (Cl. 105—199)

This invention relates to a jack device specifically designed for railroad cars to enable side tracking thereof when a wheel journal or wheel axle becomes defective.

It is therefore a primary object of this invention to provide a jack device which is readily and easily installed beneath a railroad car for the purpose of relieving a wheel journal of the load carried on the wheel axle and immobilizing the wheel axle so that the car may be moved by sliding or skidding of the rail wheels on the defective axle over oiled rails for side tracking of the car.

The primary value and utility of this invention is due to the fact that the burning off of a railroad journal or the breaking of a wheel occurs on the main line of the railroad and of course disrupts their entire schedule while this particular train, along with the car having the defective axle, is removed. In the majority of cases these breakdowns occur in remote areas where there is no easy way to get at the particular car having the burnt journal or defective axle or to get the heavy equipment now required to jack up the equipment and to tie the axle so that the car can be skidded. This invention is therefore intended to be of light weight and can be probably carried by two men easily and therefore can be taken by handcar or other similar device and carried to the particular car on which the trouble has occurred. It can be installed by one or two men without the heavy equipment now required for the correction of the situation.

The present invention involves therefore the adjustable suspension of the novel jack device below a railroad car and above the defective axle thereof and clamping the jack device to the axle. The jack device when actuated will then relieve the wheel journal of the load and also yieldably resist rotation of the wheel axle so that the car may be skid to a side track.

An additional object of this invention is to provide a jack device applied between the car body and the wheel axle of a railroad car which will accommodate angular displacement of the wheel axle so that the railroad car may be moved over curved track sections. In the past where the axle has been tied up by manual labor and jacking device, the wheel which remains at the opposite end of the axle invariably tends to jump the track because there has been no allowance for any pivotal means or angular displacement of the axle to conform to the oracle curve in the track as the skidding continues, and consequently in many instances the wheel jumps the track causing even greater delay. Therefore, this particular feature of the invention, added to the value to the railroad of getting a defective car off of the main line, makes this invention a valuable one to the railroad industry.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a sectional view taken substantially through a plane indicated by section line 3—3 in FIGURE 1.

FIGURE 4 is a perspective view showing the parts of the jack assembled.

Figure 1:
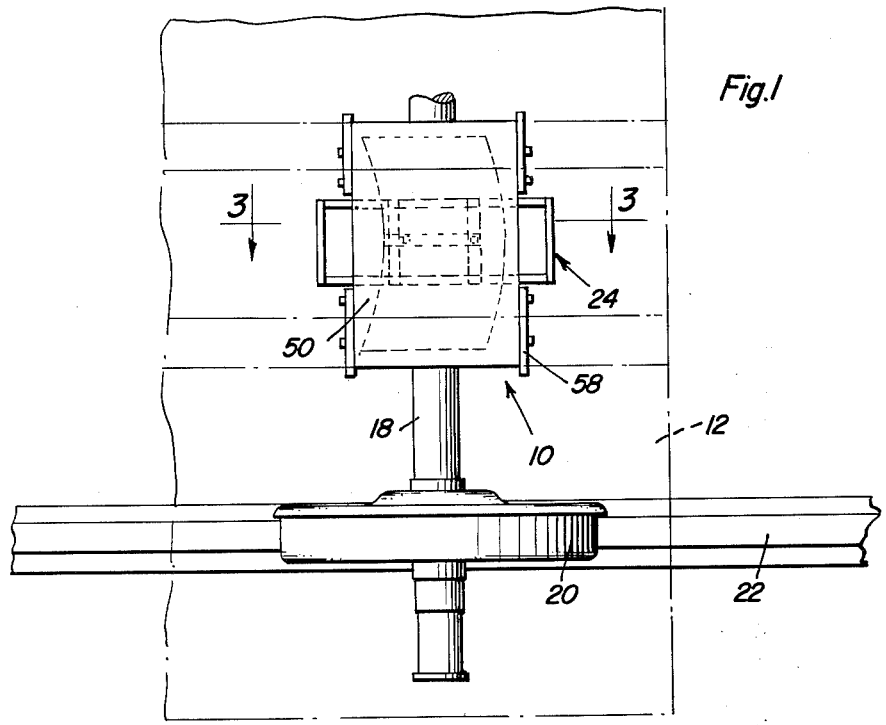
FIGURE 1 is a top plan view of the jack device installed on a defective wheel axle of a railroad car the journal box having been removed.

Referring now to the drawings in detail, it will be observed that the jack device generally referred to by reference numeral 10 is shown mounted below the body 12 of a railroad car by adjustable suspension thereof from the center sills 14 and 16 longitudinally mounted beneath the usual railroad car. The jack device 10 is however not a permanent part of the car but is installed and connected to a defective wheel axle 18 for which reason the wheel journal has been removed. It will be apparent to those skilled in the art that wheel axles become defective because of improper journaling in the journal boxes resulting from either wearing of the bearing surfaces in the journal box or a broken or bent axle shaft, so that proper bearing support is no longer available. It then becomes necessary to temporarily replace the journal box as the connection for the axle shaft to the railroad car in spaced relation therebelow in order to remove the car by sliding of the axle mounted wheels 20 over the rails 22. The jack device 10 is accordingly operative after being installed by connection to the bottom of the railroad car 12 and to a single axle 18 to sufficiently displace the car above the axle by vertical extension of the jack device, so as to relieve the load on the journal boxes through which the axle was originally connected to the car and loaded thereby, whereupon the axle is tied to the car in spaced relation therebelow for rail sliding removal thereof.

The jack device 10 which is slidably suspended from below the railroad car on the sills 14 and 16, is adjustably positioned over the defective wheel axle 18 and the lower unit 24 thereof is connected to the axle. The lower unit 24 as illustrated is made of plate steel forming a housing within which a pair of spaced compartments 26 and 28 are formed. The compartments are spaced by a spacing partition member 30. Accordingly, the compartments 26 and 28 are disposed on opposite sides of the wheel axle 18 after the lower unit 24 has been mounted thereon. A cut-out 32 is therefore provided in the lower unit 24 for accommodating the wheel axle 18 and is disposed between the compartments 26 and 28. The unit 24 is rotationally fixed to the axles by means of the lower clamp member 34 which is suitably bolted to the bottom of the unit 24 and disposed beneath the axle 18 as more clearly seen in FIGURE 3. Accordingly, the lower unit 24 will house within the compartments 26 and 28 a pair of hydraulic mechanisms 36 and 38 disposed on opposite sides of the wheel axle 18. It will of course be understood that the unit housing may be fabricated by casting in one piece if desired.

Figure 2:
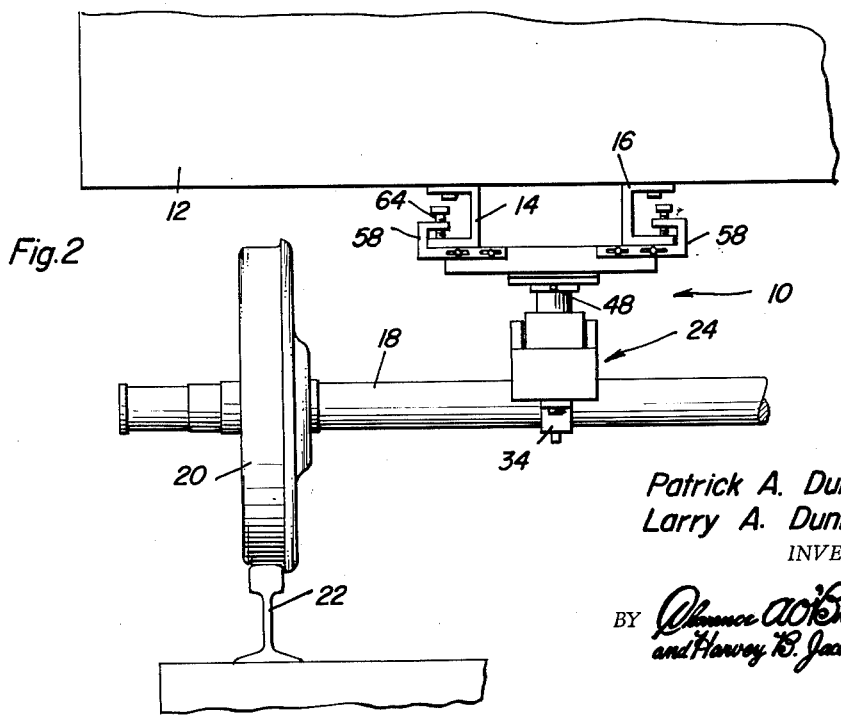
FIGURE 2 is a front elevational view of the installed jack device illustrated in FIGURE 1.

The hydraulic mechanisms 36 and 37 include a cylinder 40 disposed within the compartments 26 and 28 and vertically extensible piston members 42 which project above and upwardly displaceable when pressure is supplied to the cylinders 40. The upper ends of the pistons 42 are interconnected by a jack plate member 44 so that the displacing forces of the pistons 42 may be combined to upwardly displace the car body a sufficient amount to relieve the wheel journal of the load. It will therefore be apparent, that the hydraulic mechanisms 36 and 38 which are disposed at equal distances on either side of the axles 18 will carry the load and will also by virtue of their disposition on opposite sides of the axle yieldably resist limited angular displacement the wheel axles 18 in either direction but otherwise rotationally immobilize the axle. The jack plate member 44 is therefore operatively connected to the upper ends of the piston 42 by means of downwardly projecting annular members 46 which receive the upper ends of the piston 42 and are connected thereto by suitable slip-in pins 48 as seen in FIGURE 2.

In order to anchor the jack device 10 to the car body in its aligned position above the defective axle 18, a sill plate member 50 is provided which extends between the center sills 14 and 16. The sill plate member 50 therefore is provided on the opposite sides 52 and 54 thereof, with threaded apertures 56 for the purpose of adjustably connecting thereto pairs of adjustable sill clamp members 58. Threaded fastener elements 60 accordingly adjustably connect the clamp members 58 to the sides 52 and 54 through adjustment slots 62 provided in the lower leg of the clamp members 58. The clamp members 58 accordingly slidably suspend the plate member 50 from the center sills 14 and 16 and may lock the plate member 50 in an aligned position above the axle 18 by means of the lock elements 64 which engage the lower flanges of the center sills 14 and 16 for such purpose as more clearly seen in FIGURE 2.

The sill plate member 50 is therefore connected to the jack plate member 44 to form the jack assembly 10 with the connection being such as to accommodate angular displacement of the axle 18 and the lower unit 24 connected thereto with respect to the car body or the sill plate member 50 connected thereto, to thereby enable the rail wheels 20 to skid over curved sections of the track when required. The jack plate member 44 is therefore connected to a pivot plate member 66 by means of a centrally disposed spacer portion 68 as more clearly seen in FIGURE 3. The pivot plate 66 includes a curved front edge 70 and a parallel curved back edge 72. The pivot plate 66 is therefore received within a track member 74 which is suitably fixed to the bottom of the sill plate member 50. The pivot plate member 66 is held assembled within the track member 74 by means of a pair of spacer members 76 which are rigidly connected to the bottom of the track member 74. The track member 74 is also provided a front race 78 and a back race 80 which respectively slidingly receive the edges 70 and 72 on the pivot plate 66. The radius of curvature of the edges 70 and 72 and the races 78 and 80 is chosen at a suitable large value so as to permit curvilinear movement of the lower unit 24 connected to the pivot plate 66 by the jack plate 44 relative to the car body or track member 74 connected thereto, about a vertical axis and in response to angularly displacing forces applied to the wheel axle 18 when the car is moved over curved sections of track.

From the foregoing description, operation and utility of the novel jack assembly will be apparent. It will therefore be appreciated that by virtue of the novel construction of the jack device, disabled railroad cars may be side tracked more rapidly. Also jumping off the track when the car is being side tracked is avoided because of one of the attributes of the jack assembly including its ability to accommodate angular displacement thereof when moving over curved track sections and its ability to yieldably immobilize the axle from rotation as well as to sustain the load transmitted to the axle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A skidding wheel jack device applicable to a railroad car having center sills disposed therebeneath and between rail wheels mounted on an axle, comprising axle mounting means rotationally fixed to the axle for axle mounting purposes, sill anchoring means adjustably mounted on the sills for anchoring thereof below the railroad car in alignment with and above the axle, lifting means mounted by said axle mounting means on opposite sides of the axle for displacing the axle relative to the sill anchoring means and connecting means operatively connecting the lifting means to the sill anchoring means and operative in response to displacement of the lifting means to transmit the load of the railroad car to the axle and yieldably resist angular displacement of the axle whereby said railroad car with a damaged axle and/or journal may be side-tracked.

2. The combination of claim 1, wherein said connecting means includes pivot means accommodating angular displacement of the axle and axle mounting means relative to the sill and sill anchoring means about a vertical axis to permit sliding of the rail wheels over curved track.

3. The combination of claim 2, wherein said axle mounting means comprises a housing having spaced compartments for receiving the lifting means and removable clamp means for locking the housing to the axle between the compartments.

4. The combination of claim 3, wherein said lifting means comprises a pair of hydraulic cylinders mounted by the axle mounting means on opposite sides of the axle, a pair of pistons slidably mounted in the cylinders projecting upwardly therefrom and a jack plate member interconnecting said pistons above the axle.

5. The combination of claim 4, wherein said sill anchoring means comprises a sill plate member connected to said connecting means, adjustable sill clamps connected to opposite sides of said sill plate member and projecting upwardly therefrom for slidable suspension of the sill plate member from the sills, and lock means mounted on the sill clamps for locking the sill plate member in an aligned position on the sills.

6. The combination of claim 4 wherein said pivot means includes a pivot plate fixed to the lifting means, arcuate track means fixedly mounted on the sill anchoring means and slidably receiving the pivot plate for curvilinear displacement thereof.

7. The combination of claim 1 wherein said connecting means includes a pivot plate fixed to the lifting means, arcuate track means fixedly mounted on the sill anchoring means and slidably receiving the pivot plate for curvilinear displacement thereof to permit sliding of the rail wheels over curved track.

8. The combination of claim 7 wherein said lifting means comprises a pair of hydraulic cylinders mounted by the axle mounting means on opposite sides of the axle, a pair of pistons slidably mounted in the cylinders projecting upwardly therefrom and a jack plate member interconnecting said pistons above the axle.

References Cited in the file of this patent

UNITED STATES PATENTS

| | | |
|---|---|---|
| 2,556,610 | Biszantz | June 12, 1951 |
| 2,623,758 | Cruz | Dec. 30, 1952 |